(12) United States Patent
Carlsson et al.

(10) Patent No.: US 7,864,215 B2
(45) Date of Patent: Jan. 4, 2011

(54) METHOD AND DEVICE FOR GENERATING WIDE IMAGE SEQUENCES

(75) Inventors: Stefan Carlsson, Stockholm (SE); Eric Hayman, Bromma (SE); Josephine Sullivan, Stockholm (SE)

(73) Assignee: CogEye AB

( * ) Notice: Subject to any disclaimer, the term of this patent is extended or adjusted under 35 U.S.C. 154(b) by 927 days.

(21) Appl. No.: 10/564,286

(22) PCT Filed: Jul. 8, 2004

(86) PCT No.: PCT/SE2004/001110

§ 371 (c)(1),
(2), (4) Date: Jan. 11, 2006

(87) PCT Pub. No.: WO2005/006776

PCT Pub. Date: Jan. 20, 2005

(65) Prior Publication Data

US 2006/0181610 A1 Aug. 17, 2006

(30) Foreign Application Priority Data

Jul. 14, 2003 (SE) .................................. 0302065

(51) Int. Cl.
*H04N 5/232* (2006.01)
(52) U.S. Cl. ................ 348/211.11; 348/159; 348/218.1
(58) Field of Classification Search ................ 348/159, 348/36, 38, 39, 143, 153, 207.99–376; 382/276–325
See application file for complete search history.

(56) References Cited

U.S. PATENT DOCUMENTS 5,187,571 A 2/1993 Braun et al.

(Continued)

FOREIGN PATENT DOCUMENTS

| FR | 2696893 | 4/1994 |
|----|---------|--------|
| GB | 2354388 | 3/2001 |
| GB | A-2354388 | 3/2001 |
| JP | A-10187929 | 7/1998 |
| WO | WO 03041411 | 5/2003 |

OTHER PUBLICATIONS

Linhong Yang and Masahito Hirakawa, A Stitching Algorithm of Still Picture with Camera Translation, 2002, Proceedings of the First International Symposium on Cyber World (CW'02), IEEE Computer Society.*

(Continued)

*Primary Examiner*—Tuan Ho
*Assistant Examiner*—Kent Wang
(74) *Attorney, Agent, or Firm*—Alston + Bird LLP

(57) ABSTRACT

The invention relates to a video recording apparatus comprising: a microprocessor (130), a memory means (120) for storing program for generating a set of calibration parameters related to a device having at least two video cameras which are arranged in a predetermined relationship to each other, said parameters being unique for the at least two cameras and their current location as related to the object being recorded; said memory means (120) also storing program for recording of wide image video sequences; read and write memory means (140) for storing data relating to recorded video sequences from at least two video cameras; input means (300) for input of manual input of parameters, input of recorded video sequences, output means (300) for output of a wide image video sequence. The invention also relates to a method for generating a wide image video sequence, said method comprising the steps of generating a set of calibration parameters related to a device having at least two video cameras which are arranged in a predetermined relationship to each other, said parameters being unique for the at least two cameras and their current location as related to the object being recorded; recording synchronously video sequences using each of said at least two video cameras, and generating a wide image video sequence from each of said synchronously recorded video sequences.

40 Claims, 10 Drawing Sheets

U.S. PATENT DOCUMENTS

| | | | |
|---|---|---|---|
| 5,444,478 A | 8/1995 | Lelong et al. | |
| 5,731,846 A * | 3/1998 | Kreitman et al. | 348/581 |
| 5,963,664 A * | 10/1999 | Kumar et al. | 382/154 |
| 6,392,658 B1 | 5/2002 | Oura | |
| 6,445,293 B1 * | 9/2002 | Alonso et al. | 340/541 |
| 6,549,650 B1 * | 4/2003 | Ishikawa et al. | 382/154 |
| 6,665,003 B1 * | 12/2003 | Peleg et al. | 348/36 |
| 6,771,304 B1 * | 8/2004 | Mancuso et al. | 348/39 |
| 6,778,207 B1 * | 8/2004 | Lee et al. | 348/36 |
| 6,801,653 B1 * | 10/2004 | Wu et al. | 382/154 |
| 6,859,549 B1 * | 2/2005 | Oliensis | 382/154 |
| 6,911,995 B2 * | 6/2005 | Ivanov et al. | 348/42 |
| 6,930,703 B1 * | 8/2005 | Hubel et al. | 348/37 |
| 6,947,076 B1 * | 9/2005 | Kitaguchi et al. | 348/218.1 |
| 6,995,790 B2 * | 2/2006 | Higurashi et al. | 348/218.1 |
| 7,064,783 B2 * | 6/2006 | Colavin et al. | 348/231.3 |
| 7,098,914 B1 * | 8/2006 | Katayama et al. | 345/427 |
| 7,307,654 B2 * | 12/2007 | Chang | 348/218.1 |
| 7,313,289 B2 * | 12/2007 | Murata et al. | 382/275 |
| 7,373,017 B2 * | 5/2008 | Edwards et al. | 382/284 |
| 7,386,188 B2 * | 6/2008 | Peterson | 382/284 |
| 2003/0071906 A1 * | 4/2003 | Matsumoto | 348/241 |
| 2003/0133019 A1 | 7/2003 | Higurashi et al. | |
| 2003/0210329 A1 * | 11/2003 | Aagaard et al. | 348/159 |
| 2004/0085451 A1 * | 5/2004 | Chang | 348/159 |

OTHER PUBLICATIONS

EPO Office Action from Application Serial No. 04 749 146.9-2002 dated Feb. 26, 2010.

EPO Office Action from Application Serial No. 04 749 146.9-2002 dated Oct. 19, 2006.

* cited by examiner a.

b.

c.

d.

f.

METHOD AND DEVICE FOR GENERATING WIDE IMAGE SEQUENCES

FIELD OF THE INVENTION

The present invention generally relates to a video recording method, a video display method and video recording apparatus, a video control program on a carrier and a video display control program for interactive viewing.

BACKGROUND OF THE INVENTION

Conventional video is recorded and displayed in a format exhibiting a ratio of 4 to 3 as related to horizontal and vertical elongation. The resolution in a video image is determined by the number of picture elements (pixels), which in a conventional video is in the range of 700-800 in the horizontal direction and 500-600 in the vertical direction.

For the purpose of this application the word video should also be understood as a sequence of digital images. Wide image should be understood as a form of a panoramic image.

Also, for the purpose of this invention the wording "predetermined relationship" should be understood that there needs to be some overlap between images from the cameras used in the method for generating wide image video sequences, and that each part of the area of interest is covered by at least one camera. Thus it is not necessary to know focal lengths or rotation angles.

PRIOR ART

Wide panorama images composed of several individual images are known within the neighboring arts. Examples of such art are found in U.S. Pat. No. 5,444,478 A and in GB 2354388 A.

SUMMARY OF THE INVENTION

The present invention concerns a method of combining a number of simultaneous video sequences generated by several cameras. It also concerns an apparatus for recording of such a video sequence, as well as control program for creating the composed video sequences and control program for interactive viewing of such sequences as well as for display of the same. The invention also concerns a video player for watching the recorded video sequences.

A known problem when watching field sports on e.g. television is that in order to get a image of the whole field and thus a possible overview the camera has to be set far away from the field and the resulting image will by necessity be very small in details. By zooming in on different parts of the field the camera may of course catch details but the "whole image" will be lost. Anyone having watched a soccer game on television will know the problem existing.

According to the invention the wide image video is created digitally by combining image information from several cameras which together cover a wide field of vision. The wide image video may be thought of as an image from a virtual camera with an extremely wide field of vision. Every point of the scene being recorded will be recorded by at least one camera. Every point in the image from each camera corresponds to an unambiguously corresponding point in the synthetic wide image. By transferring the intensity of this last point to the synthetic wide image the wide image is formed. By intensity according to this invention is included the combination of colors which build up every point in the image as well as the ratio of each such color.

In order to be able to transfer the intensity from each point to the synthetic wide image the relation between the respective coordinates for the pixels in the individual cameras and in the synthetic wide image must be ascertained. This relation may be described according to the invention mathematically by a projective transformation. The transformation may be determined through observations of the coordinates for a number of points in the scene which is depicted by more than one camera.

According to the invention this step is a crucial step of the process. The cameras used are stationary and the relation between the images presented by each camera is determined by identifying corresponding points in overlapping parts of the images. In the case of a football field or any game sport where lines are indicated in the field these lines may be used for this purpose.

The wide image video may be displayed on and viewed on e.g. conventional computer screens or the like. The onlooker may decide to view either the whole image to focus on parts of the same, by using a special program according to the invention. As is know within the art the computer may be connected to a projector to project the video image on a larger area, i.e. a film screen, a smart board, or the like. The wide image video may also be cut into such sizes as to fit in a television screen or the side image video may also be cut into parts, each part televised over different television channels and then when received be projected on a screen or the like for showing all of the wide video image, or video sequence.

Viewing of the video sequence on a film screen may be performed using several projectors in order to preserve the high quality and the resolution. The wide image sequence is for this purpose split into a number of part sequences of conventional video size. These part sequences are thereafter displayed and projected side by side in order to form a wide projected image.

It is thus an object of the present invention to generate a considerably wider image which covers a considerably wider field of vision than a conventional video image.

It is also an object of the present invention to generate video sequences having a desired format and a desired resolution by combining sequences recorded simultaneously using several cameras.

It is also an object of the present invention to generate a video sequence where the format exhibits a ratio of e.g. 2 to 1 as related to horizontal and vertical elongation with approximately 2500 pixels in the horizontal elongation.

It is also an object of the present invention to provide means for choosing a specified area to be moved over the wide image and to possibly enlarge the chosen area (zooming in on an interesting part of the screen). This feature may also be used in case a display is used which is not wide enough to hold all of the wide image.

The present invention therefore provides a method for generating a wide image video sequence, said method comprising the steps of: a. generating a set of calibration parameters related to a device having at least two video cameras which are arranged in a predetermined relationship to each other, said parameters being unique for the at least two cameras and their current location as related to the object being recorded; b. recording synchronously video sequences using each of said at least two video cameras, and c. generating a wide image video sequence from each of said synchronously recorded video sequences.

The method preferably provides the storing of the synchronously recorded video sequences in a memory means. The method also provides for the synchronously recorded video sequences being concurrently used for generating the wide image video sequence. The method also provides for the wide image video sequence being transmitted live. The method also provides for the wide image video sequence being stored on a memory means.

The invention also provides for a method for generation of calibration parameters comprising the following steps: a. Start of calibration process; b. Synchronizing the sequences from each camera, which means that at least a video sequence has to be recorded by all cameras; c. Computing inter-image projective transformations; d. Use the transformations to refer each image to a common reference frame; e. Choose a real or virtual reference view such that certain lines on the pitch and/or stadium are essentially horizontal and parallel in the wide image; f. Select a rectangular region of interest within the wide image. This region contains the entire pitch and as much of the stadium as is required or visible; and g. Record all computed values resulting from the calibration process to be used as the calibration parameters. In the description and the claims a pitch or a stadium is referred to as an example only. However this could be any wide view which one wants to cover over a wide viewing angle.

The invention also provides for the steps of finding the lens distortion parameter(s) for each camera, and correcting radial distortion in each image produced are comprised, and further provides for a step in which selection of non-linear distortion parameters to reduce perspective distortion of the wide image is comprised.

The invention further provides for step b of the method being performed manually by identification of corresponding features in concurrent video images and the coordinates for these corresponding features are input to a computer means. Step b may also be performed automatically by an algorithm for identification of corresponding features in concurrent video images and the coordinates for these corresponding features are input to a computer means.

The invention also provides for a method of recording or sending live a side video sequence which comprises the following steps: a. Apply the computed and registered calibration parameters. For each pixel in the wide image, compute and store parameters describing 1. Which pixels from which image(s) contributes to this pixel in the wide image.

2. How much these pixels each contribute to the wide image. b. Repeat until the end of the sequence is reached, c. Obtain one new image from each camera; d. If required, update the parameters needed to transform intensities (colors/brightness) in one or more cameras to eliminate visible seams; e. If necessary, adjust the intensities (colours/brightness) in the images from one or more cameras; f. Create the current seamless, wide image from the current images from each camera; g. Output the wide image to a display or to a memory means; and h. End of sequence. Return to step b until end of generation of the wide image video sequence.

The invention also provides for the new images from each camera are read from live sources, each such source comprising a video camera or that the new images from each video camera are read from a memory means.

The present invention further provides in a device having a processor means, which executes instructions stored in a least one memory means the above described features.

The present invention further provides a computer readable memory means storing a program which provides the above described features.

The present invention is preferably realized in video recording apparatus comprising: a microprocessor, a memory means for storing program for generating a set of calibration parameters related to a device having at least two video cameras which are arranged in a predetermined relationship to each other, said parameters being unique for the at least two cameras and their current location as related to the object being recorded;

said memory means also storing program for recording of wide image video sequences;

read and write memory means for storing data relating to recorded video sequences from at least two video cameras;

input means for input of manual input of parameters, input of recorded video sequences, output means for output of a wide image video sequence.

BRIEF DESCRIPTION OF THE DRAWINGS

In order to explain the objects, advantages and features of the present invention, reference is made below the figures of the drawings, wherein:

FIG. 12 a-b shows the selection of a part of the wide image for zooming in.

DETAILED DESCRIPTION OF THE PREFERRED EMBODIMENTS OF THE INVENTION

Figure 1:
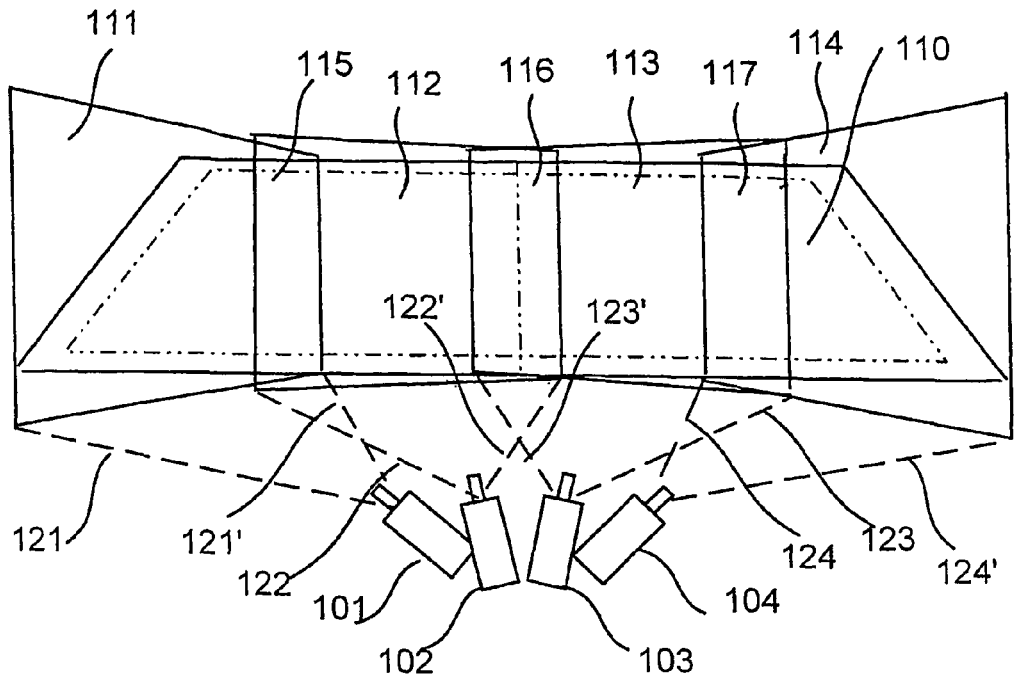
FIG. 1 shows a schematic view of a set up of four cameras according to the invention.

In a first embodiment of the apparatus of the invention the camera set up is described in connection with FIG. 1. The figure illustrates a combination of four (4) video cameras 101, 102, 103, and 104. These cameras are preferably attached to a rectangular plate (not shown) having a horizontally aligned slit. The plate is mounted on a camera tripod (not shown), and the cameras are directed towards the scene 110, being a football field, such that they cover a wide field of vision approximately 120-160 degrees. In recording events which occur over big plane areas (fields) the cameras are so adjusted as to depict an area each of approximately the same size. In this manner the quality of the wide image will be essentially uniform. Indicated is also the areas 111, 112, 113, and 114 covered by respective cameras. The views from the cameras pairwise overlap such that the area 111, and 112 has a common area 115, the area 112, and 113 has a common area 116, and the area 113, and 114 has a common area 117. Indicated are also the limits of the field of vision for each camera, 121, 122, 123, and 124.

Figure 2:
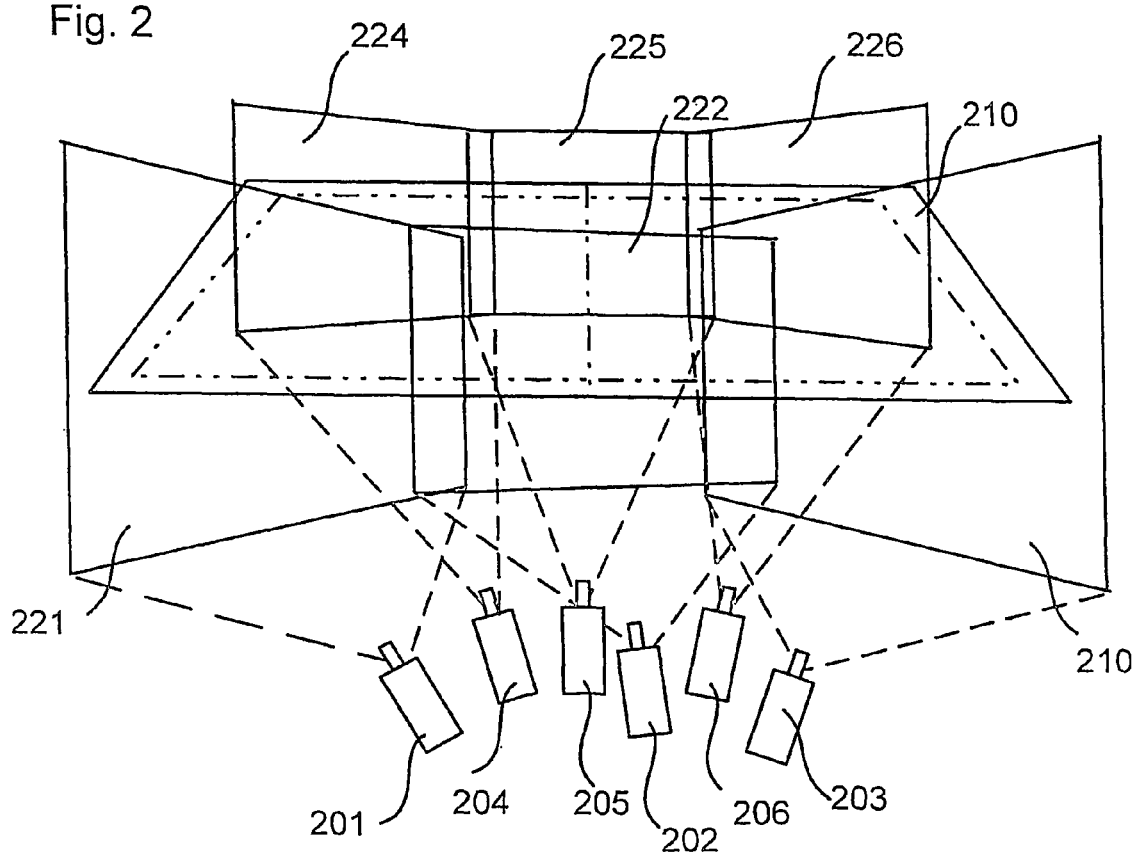
FIG. 2 shows a schematic view of a set up of six cameras according to the invention.

In FIG. 2 a corresponding set up is shown the field indicated as 210. The cameras 201, 202, and 203 cover the areas 221, 222, and 223, closest to the cameras and the cameras 204, 205, and 206 cover the areas 224, 225, and 226.

Figure 3A:
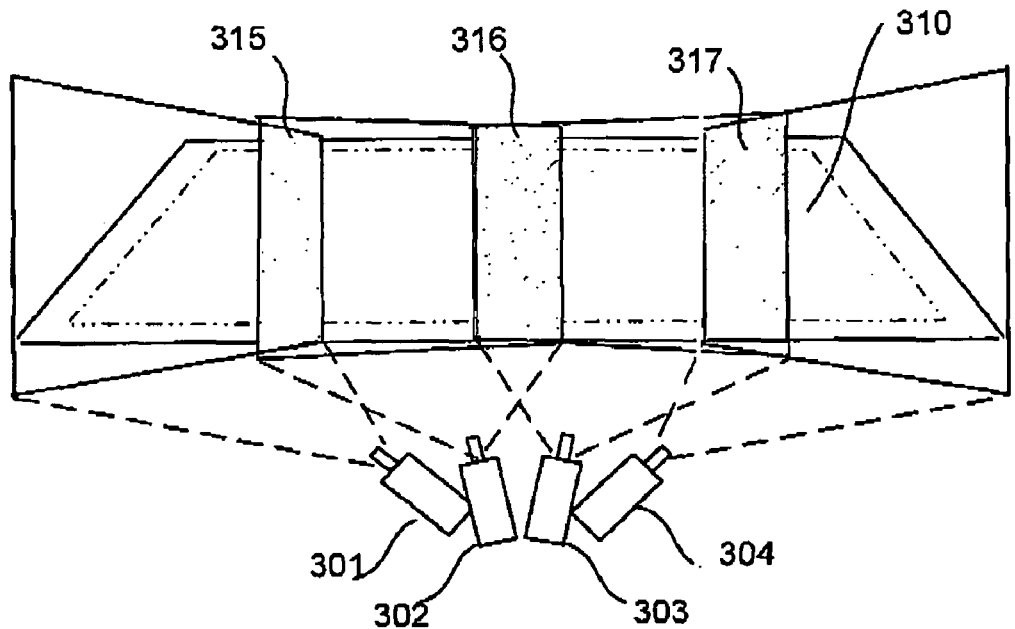
FIG. 3a illustrates the cameras and overlapping recorded areas in the embodiment according to FIG. 1.

In FIG. 3a the overlap areas 315, 326, and 317 are indicated as well as the field 310, and the cameras 301, 302, 303, and 304.

Figure 3B:
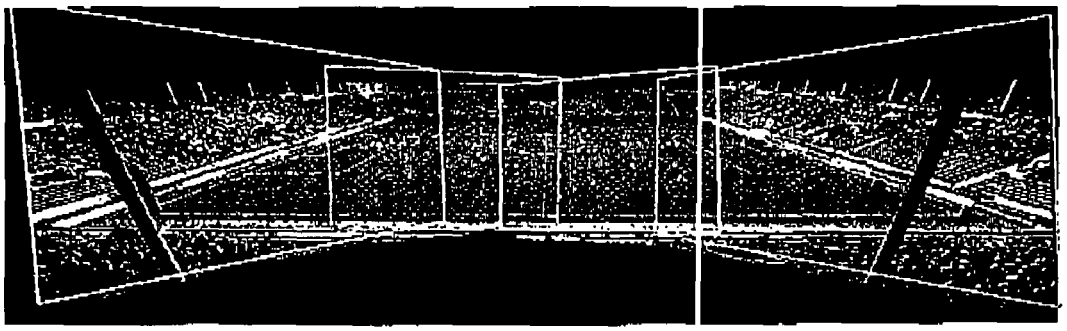
FIG. 3b illustrates the recorded areas of four cameras according to the invention as projected on the wide image.

In FIG. 3b is shown the corresponding fields on a synthesized wide image shown. The wide image thus will have its limitations in the vertical direction determined by the height if the middle cameras and in the horizontal direction by the left edge of the camera to the left and the right edge of the image of the camera to the right. Thus the different cameras contribute to different parts of the wide image and also there can be seen the there are some regions in the wide image covered by more than one camera.

Figure 4:
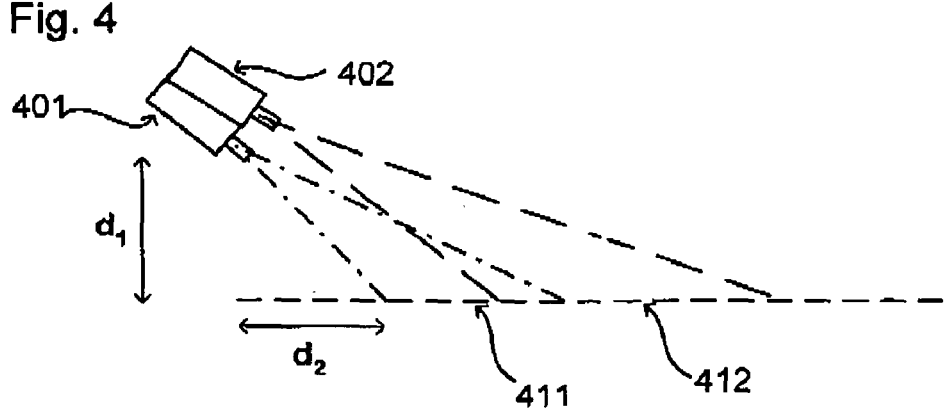
FIG. 4 shows a vertical view of two of the cameras according to the embodiment according to FIG. 2.

In FIG. 4 is schematically shown a camera set-up in a vertical view. Two cameras 401 and 402 are shown each covering the areas 411 and 412, respectively. The indicated placement of the cameras in the vertical position as related to the closest limit of the field may be $d_1$ approximately 20 meters and $d_2$ approximately 20 meters.

Figure 5:
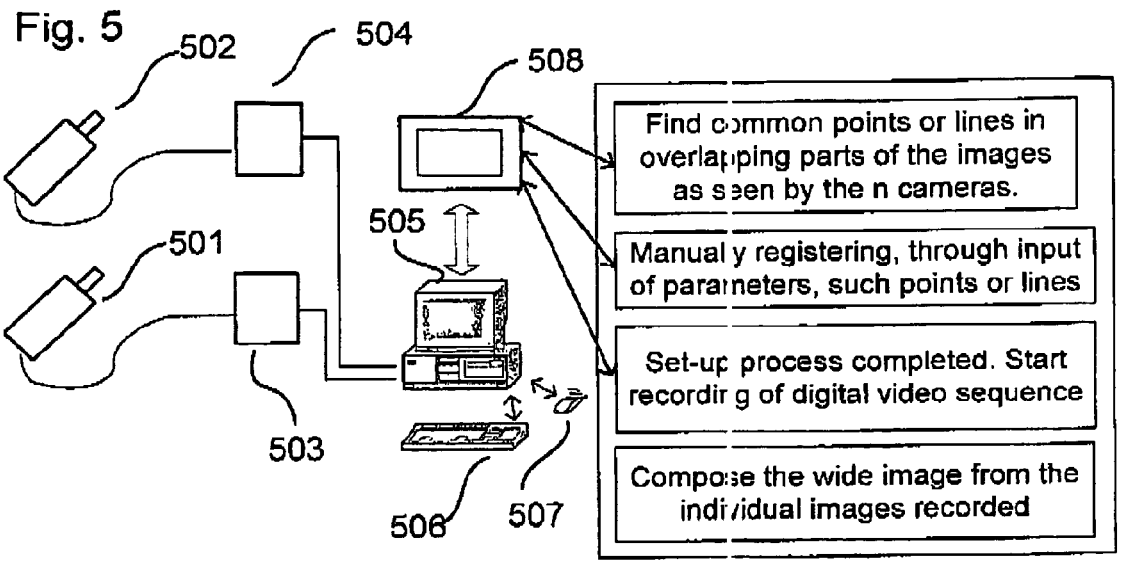
FIG. 5 illustrates schematically the initiation part of the recording of a wide image digital video sequence and the recording according to the invention.

In FIG. 5 the process of initiating the recording of a digital video sequence using the wide image concept is shown. In the figure can be seen two cameras 501, and 502. (This is no limitation only illustrating that use of more than one camera is according to the invention.) Also is seen memory means 503 and 504 and a personal computer 505 with key-board 506 and a mouse 507.

Also shown is a program 508 residing in the non-volatile memory of the computer the main procedures comprised in the program for obtaining the wide image video sequence indicated.

The procedures comprised are as follows:

Find common points or lines in overlapping parts of the images as seen by the "n" cameras.

Manually registering, through input of parameters, such points or lines. (This step could be performed also by a control program)

Set-up process completed. Start recording of digital video sequences.

Compose the wide image from the individual images recorded.

The composed wide video image may be stored on a volatile or non-volatile memory or it may be watched live.

The recorded contents of the digital video cassettes are then transferred from the cameras involved via e.g. a fire-wire connection to a write and read memory in e.g. a personal computer or the like. It is of course clear that the manner of storing and treating the images to be computed into the wide image is not crucial to the invention and there could be several ways in which to perform this.

In order to be able to generate a wide image sequence for the individual sequences, the sequences have to be projected on a common image plane. One of the image planes of the cameras may be chosen (the reference camera). The projection on the common image plane is accomplished using a co-ordinate transformation specific for each camera and each set up of the cameras.

This co-ordinate transformation is determined by noting the co-ordinates for a number of points which are in view in the current camera and also in the image plane of the reference camera simultaneously. The thus calculated co-ordinate transformation is thereafter applied to pixels from the current camera, which procedure gradually builds the wide image in the image plane of the reference camera.

Figure 6:
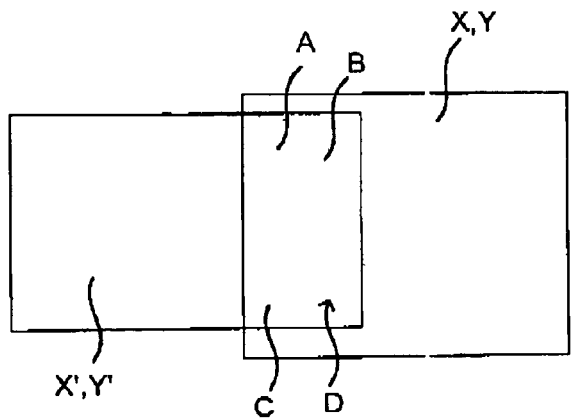
FIG. 6a illustrates the coordinate transformation.
FIG. 6b illustrates the weighted image value.
FIG. 6c illustrates how to provide a seamless transition from image 1 to image 2.
FIG. 6d illustrates the projective transformations between the cameras.
FIG. 6e illustrates the result of the projective transformations between the cameras.
Figure 6:
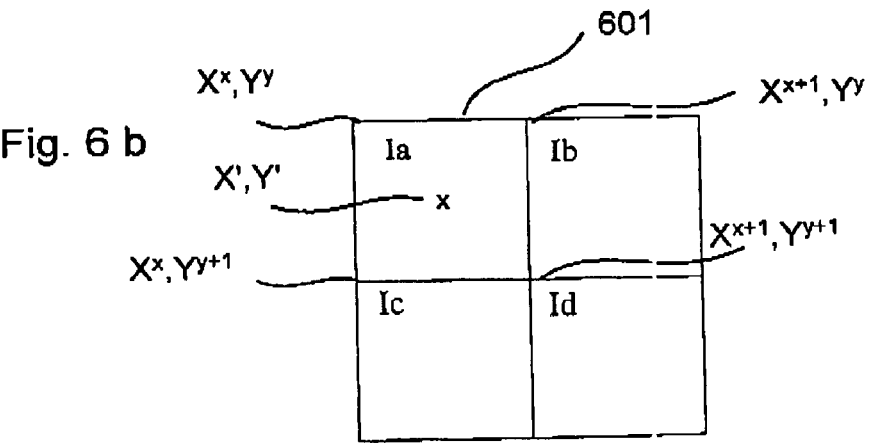

This transformation is illustrated in FIG. 6a. If (X', Y') denotes the co-ordinates of the pixel in a current camera and (X, Y) the co-ordinates of the corresponding pixel in the reference camera the following relation between these co-ordinates may be described using a projective transformation:

$$X' = \frac{aX + bY + c}{dX + eY + f} \quad (I)$$

$$Y' = \frac{gX + hY + i}{dX + eY + f} \quad (II)$$

The parameters a, b, c, d, e, f, g, h, and i are determined by noting the co-ordinates for a number of chosen points which are can be seen in both the current camera and in the reference camera.

When using lines instead of points the equations will differ slightly but principally they are the same.

The parameters {a,b,c,d,e,f,g,h,i} can also be found linearly from pairs of corresponding straight lines. Suitable line features are the pitch markings and straight edges on buildings or advertisement boards.

If a line in image 1 is represented in homogeneous coordinates as $(L_1, L_2, L_3)$ such that the point (X, Y) lies on the line if and only if $L_1X+L_2Y+L_3=0$, and similarly the corresponding line in image 2 is $(L_1', L_2', L_3')$, then it is known that $$L_1 = \frac{aL_1' + gL_2' + dL_3'}{cL_1' + iL_2' + fL_3'} \quad (III)$$

$$L_2 = \frac{bL_1' + hL_2' + eL_3'}{cL_1' + iL_2' + fL_3'} \quad (IV)$$

The equations for points can be combined with the equations for lines to solve for {a,b,c,d,e,f,g,i} simultaneously using linear methods. Alternatively, with a redundant set of equations, other error measures can be minimized using known non-linear optimization techniques, R. I. Hartley and A. Zisserman. *Multiple View Geometry in Computer Vision*. Cambridge University Press, ISBN: 0521623049, 2000. To suppress noise in the coordinates of points and lines, it is advantageous to use more than the minimal number of points and/or lines.

Since automatic feature detection and matching is possible once a good initial estimate is available as regards a specific set-up of the cameras, it may be possible to avoid any human interaction if the apparatus has been used previously, and the cameras' relative positions and internal parameters (such as focal length, for this specific set-up, n. b. this does not imply that the focal lengths of the cameras have to be known) remained similar between its previous use and the present. In practice, however, some human interaction to define the lines on the pitch and stadium may still desirable to make the procedure more robust to failure of edge detection algorithms to find long lines corresponding to pitch markings and other lines in the stadium.

Rather than using x and y coordinates of point and line features, it is also possible to compute the parameters in the homography from the intensity (brightness/colour) values using an iterative scheme such as that described in (J. R. Bergen, P. Anandan, K. J. Hanna, and R. Hingorani. Hierarchical model-based motion estimation. In *Proc. 2nd European Conference on Computer Vision, Santa Margharita Ligure, Italy*, pages 237-252, 1992.).

A combination of the line/point features and the intensity feature is within the scope of the invention.

By setting limitations, i.e. making assumptions on internal parameter of the cameras, e.g. assuming that only the focal length is unknown, a reduction of the parameter set may be accomplished.

The individual camera images should, preferably, also be corrected for lens distortion. The parameters {a,b,c,d,e,f,g,h} are only the correct description of the inter-camera geometry if the idealized pinhole camera model is valid. Many real-world cameras exhibit lens distortion (for instance wide-angle lenses usually have barreling distortion) such that lines which are straight in the world are imaged as curves. The most significant lens distortion may be captured by a single parameter, $\kappa$, for radial distortion $$X_D = X_0 + (X_U - X_0)[1 + \kappa(X_U - X_0)^2]^{0.5} \quad \text{(VI)}$$

$$Y_D = Y_0 + (Y_U - Y_0)[1 + \kappa(X_U - Y_0)^2]^{0.5} \quad \text{(VII)}$$

where $(X_D, Y_D)$ are the actual, distorted coordinates of a pixel, $(X_U, Y_U)$ are the (undistorted) coordinates with the corresponding pinhole-lens, and $(X_0, Y_0)$ is the centre of distortion, assumed to be the centre of the image.

For each camera, the user may interactively search for a value of K that ensures that lines which are straight in the world are imaged as straight lines in the corresponding pinhole-lens: given K it is possible, via the equations above, to transform an actual camera image into an image which could be produced by a pinhole camera model. These "corrected coordinates" are thereafter used in order to create the wide image.

Since automatic feature detection and matching is possible, it may be possible to avoid any human interaction when computing the parameters {a,b,c,d,e,f,g,h,i}. If the apparatus has been used previously, and the cameras' relative positions and internal parameters (such as focal length) remained similar between its previous use and the present (n. b. this does not imply that the focal lengths and orientations of the cameras have to be known), the problem becomes simpler since an initial estimate of the geometry is available. Some human interaction to define the lines on the pitch and stadium may still be desirable to make the procedure more robust to failure of edge detection algorithms to find long lines corresponding to pitch markings and other lines in the stadium.

The several video sequences are thus, after the distortion correction, temporally synchronized. Manual inspection is used to determine corresponding common areas. The co-ordinates for the corresponding frames are transformed and together they generate the wide image video. This transformation is performed such that for every point (X,Y) in the co-ordinate system of the wide image video it is decided from which camera of the several cameras and from which image co-ordinates (X',Y') the image information is to be gathered.

The common areas could of course also be automatically determined by using suitable measures to be implemented in a computer program.

However, as can be seen in FIG. 6b, illustrating 4 neighboring pixels, in which $X'_1, Y'_1$; are indicated resulting from the transformation into the individual camera image, the coordinates are usually not integers, and therefore the appropriate image value I is computed using a weighted interpolation of the image values Ia, Ib, Ic, and Id in the points: (X*,Y*), (X*+1,Y*), (X*,Y*+1), (X*+1,Y*+1) wherein (X*,Y*) are integers of (X',Y'). In the calibration process for each image point the reference image corresponding coordinates (X*,Y*) and the weighting factors for the interpolation, which depends on the differences between the coordinates (X*,Y*) and (X',Y') is calculated. Thus these need not be calculated in the generation of every frame.

$I = (1-dx)(1-dy)I_a + (1-dy)dxI_b + (1-dx)dyI_c + dxdyI_d$, wherein $0 \leq dx \leq 1$, $0 \leq dy \leq 1$, and $dx = X' - X^*$ and $dy = Y' - Y^*$. Ia, . . . Ib designates the intensity in each pixel.

Actually the I-value consists of $I_{red}$, $I_{green}$, and $I_{blue}$ so every calculation has in reality to be made for 3 colors. This is of course true for any other color space chosen.

In order to provide a seamless transition from image 1 to image 2, from camera 1 and 2, respectively, the intensities are blended according to $$I_{wide\ image} = w_1 I_1 + w_2 I_2, \Sigma w_i = 1. \quad \text{(VIII)}$$

This has been suggested by (M. Jethwa, A. Zisserman and A. W. Fitzgibbon. Real-time Panoramic Mosaics and Augmented Reality. *Proceedings of the 9th British Machine Vision Conference, Southampton* 1998.) the weights $w_i$ are a cosine function of the distances $d_i$ between the location (x,y) of that pixel in the wide image and the boundaries of the regions in the wide image which each camera covers.

$$w_1 = 0.5(1 + \cos(d_1 \pi/(d_1 + d_2))), w_2 = 1 - w_1 \quad \text{(IX)}$$

Figure 6C:
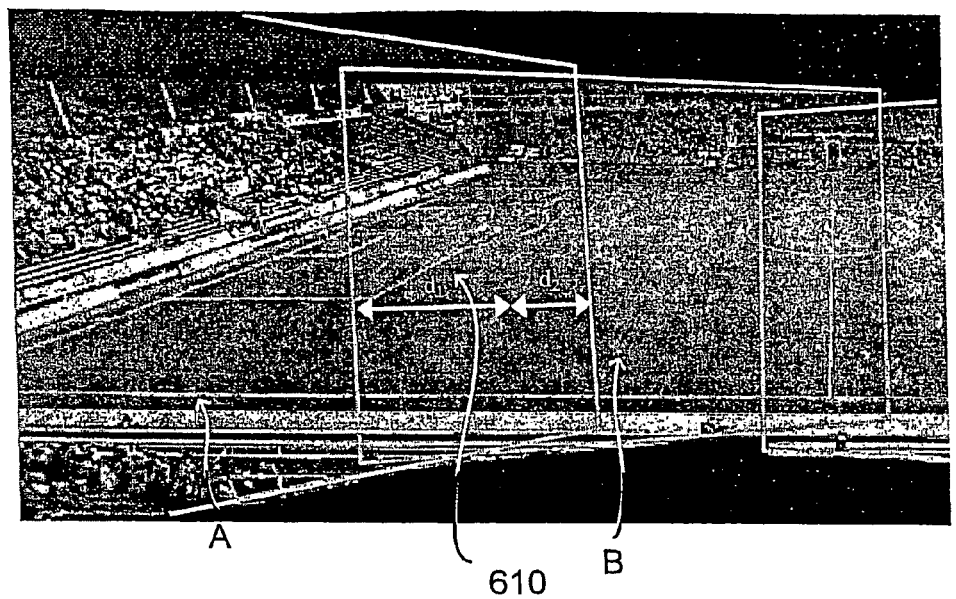

This is illustrated in FIG. 6c wherein the distances $d_1$, and $d_2$ are indicated in the overlapping portion from image A and image B. the pixel, the intensity of which is to be calculated is indicated at 610.

This scheme permits a seamless transition from image 1 to image 2 in the wide image, there are no visible joins.

However, the formula (IX) above assumes that overlapping cameras have the same settings for exposure and white-balance. If this is not the case (for instance if it is not possible to set the cameras' exposure settings manually), and if the difference in settings is too large, there is a visible seam in the final wide image. This effect may be largely eliminated by digitally adjusting the pre-recorded images from the cameras. A suitable technique is described below.

One camera in the pair is considered the reference camera, and its colour settings will remain unchanged. For the other camera, a transformation for each colour channel is sought which will reduce the seam, thus if the intensity of a channel is Z, we seek a function or look-up table f(Z) so that replacing Z←f(Z) reduces the colour difference between the images from the two cameras. This can be performed in any colour space (e.g. RGB Red-green-blue or YUV luminance-chrominance channels). In choosing YUV it is usually only necessary to modify the brightness (Y) channel if only the exposure settings differ, and the chrominance channels (U and V) can be left unchanged. The RGB is generally used for monitors and the YUV is e.g. used in the PAL-system.

A function $f(Z)$ is found by comparing the histograms of Z, computed in the region of overlap in each image. Denoting by $h_1$ the histogram of intensities within the region in image 1, by $h_2$ the histogram of the corresponding region in Image 2, and $h_2'$ the histogram of the transformed intensities, we seek a function $f(Z)$ that minimizes a suitable measure of similarity between $h_1$ and $h_2'$. One such suitable measure is the Chi-squared distance between the two histograms, $$\chi^2 = \Sigma_i (R_i - S_i)/(R_i + S_i) \quad (X)$$

where $R_i$ is the height of bin i in $h_i$ and $S_i$ is the height of bin i in $h_2'$ (Reference: Press et al 1992). The two histograms are normalized such that the sums of the bins are the same for both images, and near-empty bins are not permitted to contribute to the $\chi^2$ measure. The $\chi^2$ measure is normalized by the number of bins that contribute to the measure.

A suitable function $f(Z)$ is the parabola $Z' = f(Z) = a Z^2 + b Z$ with the constraint $a+b=1$ assuming the intensities are normalized to lie in the range 0 to 1. (Usually in digital image processing, 8 bits are used for storing each channel, giving a range of 0 to 255. Thus the intensity normalization discussed here consists of dividing the intensity by 255.) Substituting $b=1-a$, we seek the value $a^*$ of a which mininizes the cost function above for a in the range $[-1,1]$. Any standard minimization technique (e.g. exhaustive search, gradient descent, or a combination of both) may be applied. Other functions $f(Z)$ can be applied, for instance standard gamma correction functions.

Since the exposure settings can change over time, especially with auto-exposure features on cameras, the function $f(Z)$ is preferably determined at regular temporal intervals over the course of the entire event being recorded or sent live, for instance every 2 seconds, and the parameters which describe $f(Z)$ are smoothed over time to prevent sudden brightness/color changes. For instance, using the parabolic function $f(Z) = a Z^2 + b Z$, the parameter a at time t is smoothed temporally using the formula $$a_t = (1-\delta) a_{t-1} + \delta a^*$$

and $b_t$ is always given by $b_t = 1 - a_t$. $\delta$ is a constant between 0 and 1 which determines the adaptation rate of $a_t$ and $b_t$.

The thus generated wide image video sequence may be coded in e.g. the Mpeg4 format for effective storing on e.g. a digital video disk (DVD). The video sequence may also be televised as the generation of the needed at least 30 frames per second (in the US) and at least 25 frames per second (in Europe) may easily be accomplished.

Figure 6D:
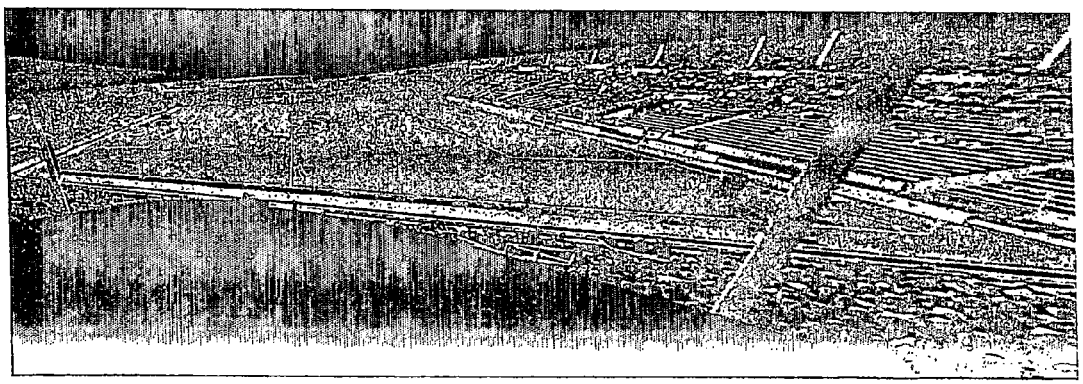
Figure 6E:
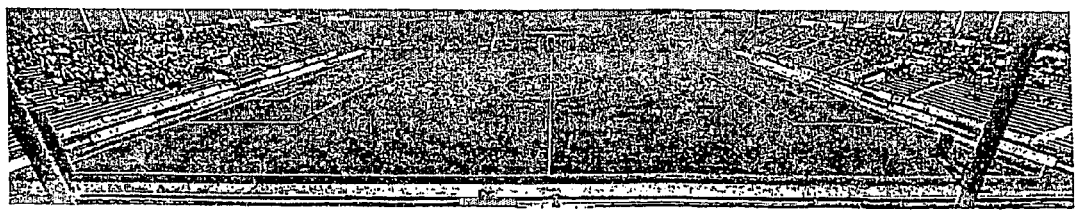

The projective transformations between the cameras (also known as inter-image "homographies") encode (i) the relative rotation between the cameras, and (ii) the cameras' internal parameters such as focal length, aspect ratio and principal point (Reference: Hartley and Zisserman 2000). It is well known that inter-image homographies can be concatenated as follows: Collecting the parameters between cameras 1 and 2 in a 3×3 matrix as $\{[a\ b\ c],[g\ h\ i],[d\ e\ f]\}$ denoted $H_{12}$, and similarly collecting the parameters describing the transformation between cameras 2 and 3 in a matrix $H_{23}$, camera 1 relates to camera 3 by the nomography defined by the matrix product $H_{12} H_{23}$. This relation generalizes to concatenating an arbitrary number of homographies. In this manner all cameras can be related to a common reference frame, most simply this common reference frame could be one of the central cameras, see FIGS. 6d and 6e.

However, for visually pleasing results, some of the pitch markings should be (a) horizontal in the wide image and (b) parallel in the wide image, as in FIG. 6b. This adjustment is achieved by referring all real cameras to a virtual camera in which these constraints are satisfied.

This virtual camera is related to any previous reference frame by a 3×3 homography matrix. Suitable techniques for obtaining this virtual view are outlined below.

1. Two lines on the pitch and/or stadium, which need to be parallel and horizontal in the wide image, are identified, for instance by clicking with a mouse on a computer display of the wide image.

Then, either

2. Perform a self-calibration to obtain the internal parameters and inter-camera rotations. Suitable techniques are discussed in (L. de Agapito, E. Hayman, and I. Reid. Self-calibration of rotating and zooming cameras. *International Journal of Computer Vision*, 45(2):107-127, 2001.).

3. Select a representative set of internal camera parameters as the internal parameters of the virtual view. For example, use the internal parameters of one of the central cameras.

4. Compute the rotation angles of the virtual view (relative to a previous reference frame) such that the required lines become parallel and horizontal in this virtual view.

OR

2. Select two of the cameras, label their images, Image i and Image j.

3. Take the eigen-decomposition of their inter-image nomography, $H_{ij} = WDW^{-1}$. The technique is based on replacing the diagonal matrix of eigenvalues, D, by another matrix D' such that the required lines are parallel in the virtual view obtained by applying $H = WD'W^{-1}$ to Image i; D' is the diagonal matrix where each eigenvalue $\lambda$ is replaced by $\lambda^\varsigma$. $\varsigma$ is found by any standard parameter estimation technique (for instance gradient descent.)

2. Apply an image-plane rotation of the virtual cameras, i.e. a rotation about the camera's optic axis, such that the required lines become horizontal in its image, and hence also in the resulting wide image.

The two methods are equivalent if, in the second method, the internal parameters of the two selected cameras are the same. In general the internal parameters differ somewhat, but they are sufficiently similar to ensure that the second method gives good results in this application.

Due to the wide viewing angle the observer will experience a distortion of depth and width relationship in the case when the point of observation deviates from the point which corresponds to the focal point of the camera in question. This distortion may partly be corrected by modifying the image.

The distortion thus may partly be corrected by modifying the image. This modification may thus be described, compare above using a non-linear transformation of the co-ordinates for the wide image $(X, Y) \rightarrow (X_s, Y_s)$.

In viewing football and other sports it is important that the shape of the field is perceived as preserved in the image: lines which are straight in reality may not appear too curved in the final image. A method which is very well fitted for display of sports is that the X and Y coordinates are transformed separately. Firstly, an invertable, non-linear transformation $X_s = T_1(X, a_x)$ is applied to the X co-ordinates and thereafter an invertable, non-linear transformation $Y_s = T_2(Y, a_y)$ is applied to the Y co-ordinates. However, as the transformations are independent of each other, $T_2$ may as well be applied before $T_1$.

$a_x$ and $a_y$ represents a number of parameters defining the transformation. This process preserves all horizontal and vertical lines, but not diagonal lines. An example of $T_1$ and $T_2$ is defined by these inverse transformations.

$$X = T_1^{-1}(X_s, \alpha_X, X_0) = X_0 + (X_s - X_0)[1 + \alpha_X(X_s - X_0)^2]$$

$$Y = T_2^{-1}(Y_s, \alpha_Y, Y_0) = Y_0 + (Y_s - Y_0)[1 + \alpha_Y(Y_s - Y_0)^2]$$

$X_0$ is defined as the X co-ordinate for the center line. $Y_0$ is chosen as a point between the center point of the field and the elongated side of the field farthest away from the cameras.

$\alpha_X$ and $\alpha_Y$ are positive parameters which determine how strong the effect of the transformation is. If $\alpha_X$ is defined by the user first then $\alpha_Y$ may be determined automatically as the values which attains the goal of making the transformed short side of the field as straight as possible in the final image. In the same manner $\alpha_Y$ may be decided by the user and then $\alpha_X$ may be automatically decided on.

Figure 7:
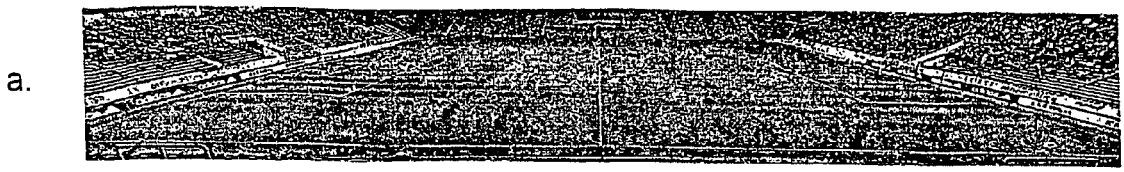
FIG. 7a shows the original wide image produced b shows a transformed image using small values for $\alpha_x$ and $\alpha_y$ c shows a transformed image using medium values for $\alpha_x$ and $\alpha_y$ d shows a transformed image using large values for $\alpha_x$ and $\alpha_y$ f shows a transformed image using very large values for $\alpha_x$ and $\alpha_y$
Figure 7:
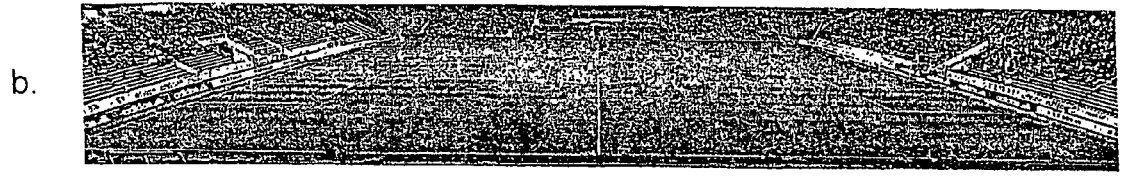
Figure 7:
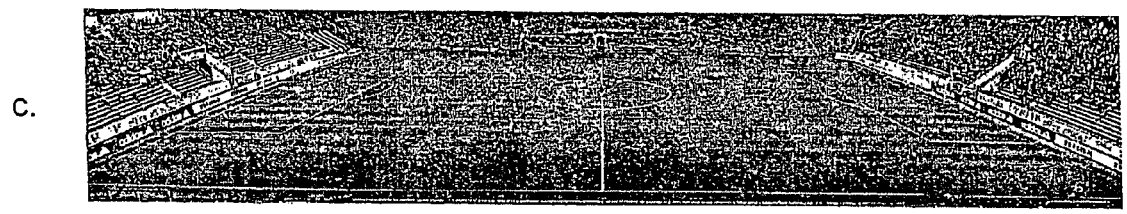
Figure 7:
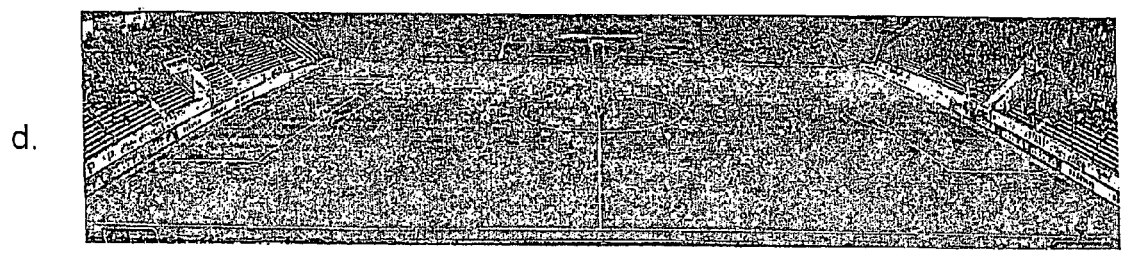
Figure 7:
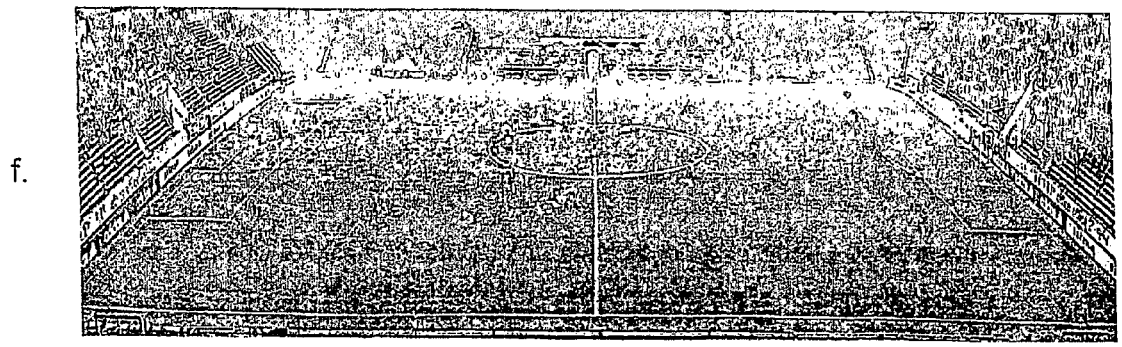

Some examples of this non-linear transformation are given in FIG. 7 a-f for different values of $\alpha_X$ and $\alpha_Y$.

Defining the inverse transformations in this manner, implies that for a given point $(X_s, Y_s)$ in the final image, one point $(X, Y)$ may be found in the uncorrected image. These transformations are combined with the projective transformation to a composite transformation. For each value of the final co-ordinates $(X_s, Y_s)$ it is decide at the time of the calibration from which camera and which image co-ordinates are to be used for generation of the correctly weighted image value.

An important aspect of the embodiments according to the invention in order to preserve straight horizontal and vertical lines in the wide video image is to use separate non-linear transformations of the X and Y co-ordinates and that the parameters used for $a_x$ and $a_y$ are fitted to each other such that the on-looker experiences a good result.

Thus a number of parameters are gathered at the beginning of the recording session and only has to be computed once. Since the cameras do not move during a recording session, the spatial calibration parameters remain unchanged and do not need re-computing during the sequence. These parameters consist of (i) radial distortion parameters, (ii) projective transformations relating each camera to the reference view, (iii) parameters describing the non-linear transformation applied to the wide image to reduce perspective distortion, (iv) parameters selecting a rectangular region of interest in the wide image (this region contains the pitch and what parts of the stadium are visible/deemed interesting), and (v) optionally an overall scale factor applied to the wide image to reduce storage requirements and enable the video to be played back on particular hardware. These transformations are concatenated to relate which pixel in which camera contributes to which pixel in the wide image: For pixel $(X,Y)$ in the final wide image, it is possible to compute the coordinates $(X',Y')$ in each camera which correspond to that pixel, as has been explained above.

Since the total transformation does not, in general, yield whole numbers in $(X',Y')$, a bilinear interpolation scheme is employed such that four pixels in that camera contribute to the wide image pixel. The interpolation, coefficients, are denoted $c_1$, $c_2$, $c_3$, $c_4$ where $c_1+c_2+c_3+c_4=1$. (We refer back to the discussion on p. 9)

If a wide image pixel is visible from two (or more) cameras, the cosine blending scheme discussed previously is employed. For n overlapping cameras there are therefore $4n$ pixels which contribute. The coefficients $c_j$ from each camera i are multiplied by the weights $w_i$ to a give a new coefficient $c'_{ij}=c_j w_i$, giving a total of $4n$ coefficients which sum to one.

An efficient computer program for generating the wide image video therefore computes the coordinates $(X',Y')$ and the blending coefficients $c'_{ij}$ only once per sequence and stores them in a table. This table is used in the computer program each time a new set of images is obtained from each camera.

The same table can be used for each channel (RGB or YUV) independently. However since the human visual system is less sensitive to chrominance than to brightness, it is possible to use subsampled UV components in a YUV source, for instance subsampling twice in both the horizontal and vertical image directions. This requires two tables: one for the Y component and another for the UV components. Since video is commonly stored and transmitted in subsampled YUV format, it is possible for the entire wide image video generation program to use subsampled YUV as its color space. This considerably reduces the computation time since the subsampled U and V channels require much less data to be processed.

Below are given some examples of algorithms used in calibrating and video generation. The program for calibration is run once per sequence: the calibration parameters found in this program may remain constant over the sequence.

Figure 8:
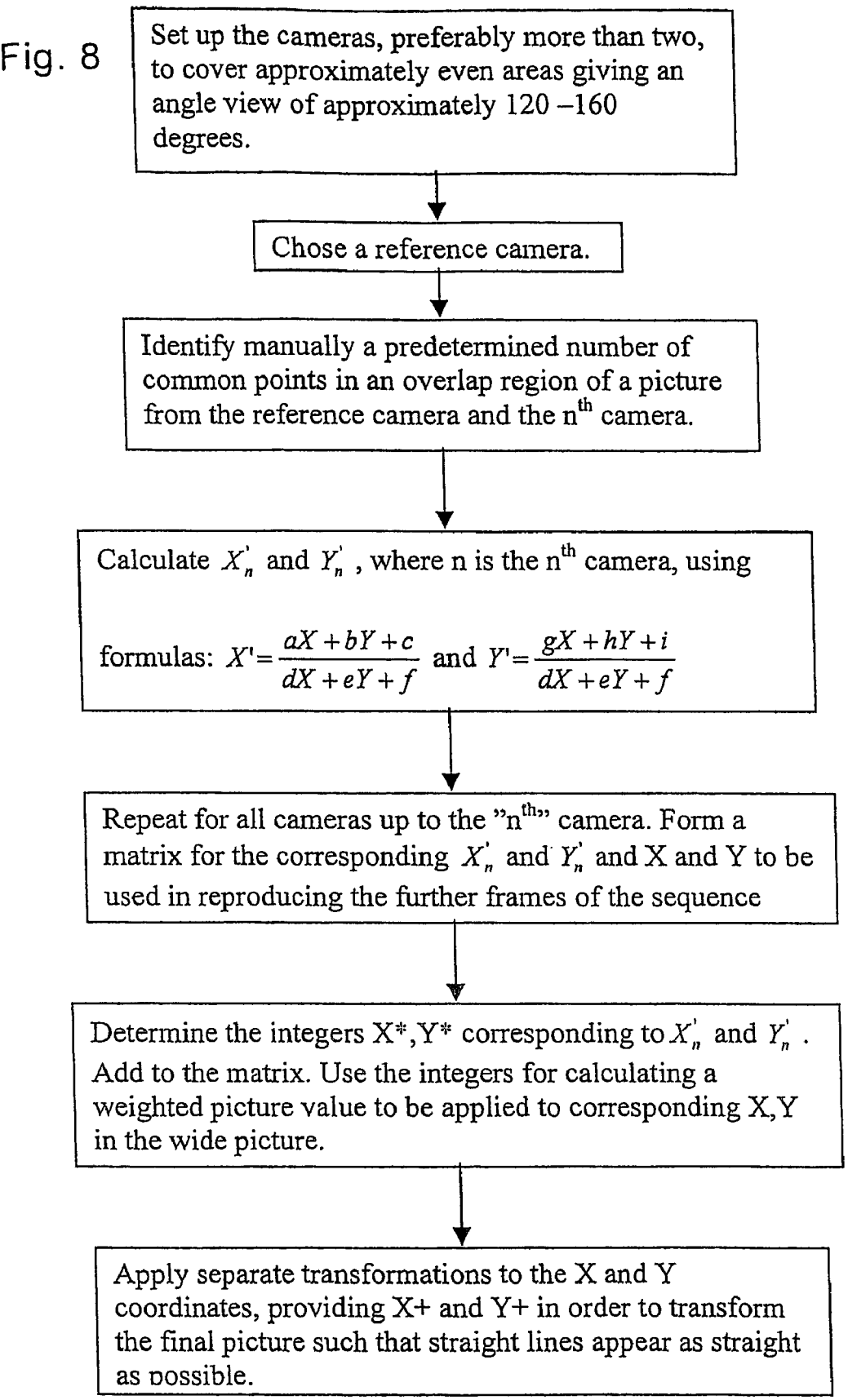
FIG. 8 shows a flow-sheet describing a process according to the invention of generating a video sequence.

In FIG. 8 a flow-sheet describing a process according to the invention for generating a video sequence is shown. This is a summary of the important steps in the form of mathematical formulas already described above and will not be further discussed here. To be noted is that the formula for calculating X' and Y' refers to a point but that the description also relates the use of formulas for lines.

Figure 9:
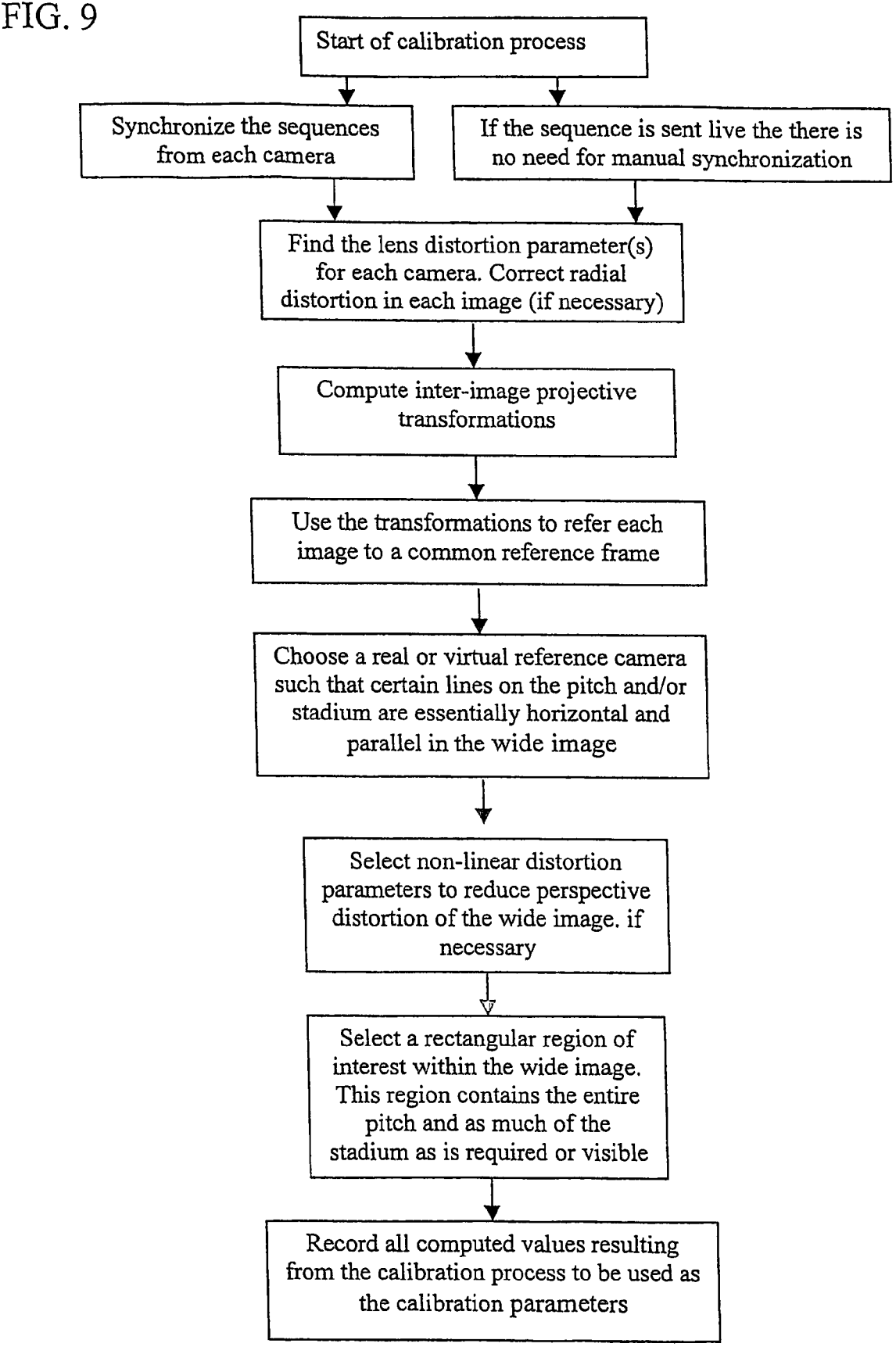
FIG. 9 shows a flow-sheet describing an example of calibration of the cameras according to the invention.

A calibration process according to the invention is illustrated in FIG. 9 and comprises the following steps:
1. Start of calibration process.
2. Synchronize the sequences from each camera, which means that at least a video sequence has to be recorded by all cameras. If the sequences are to be broadcasted live all video sequences are of course synchronized from the beginning.
3. Find the lens distortion parameter(s) for each camera. Correct radial distortion in each image produced.
4. Compute inter-image projective transformations.
5. Use the transformations to refer each image to a common reference frame.
6. Choose a real or virtual reference camera such that certain lines on the pitch and/or stadium are essentially horizontal and parallel in the wide image.
7. Select non-linear distortion parameters to reduce perspective distortion of the wide image.
8. Select a rectangular region of interest within the wide image. This region contains the entire pitch and as much of the stadium as is required or visible.
9. Record all computed values resulting from the calibration process to be used as the calibration parameters.

Among the above mentioned steps step 3 and 7 are optional as they are dependent on the cameras used and on the geometry of the view to be recorded or to be televised live.

The parameters are now there to use. It is of course possible to run the calibration process more than one time during a long sequence.

Figure 10:
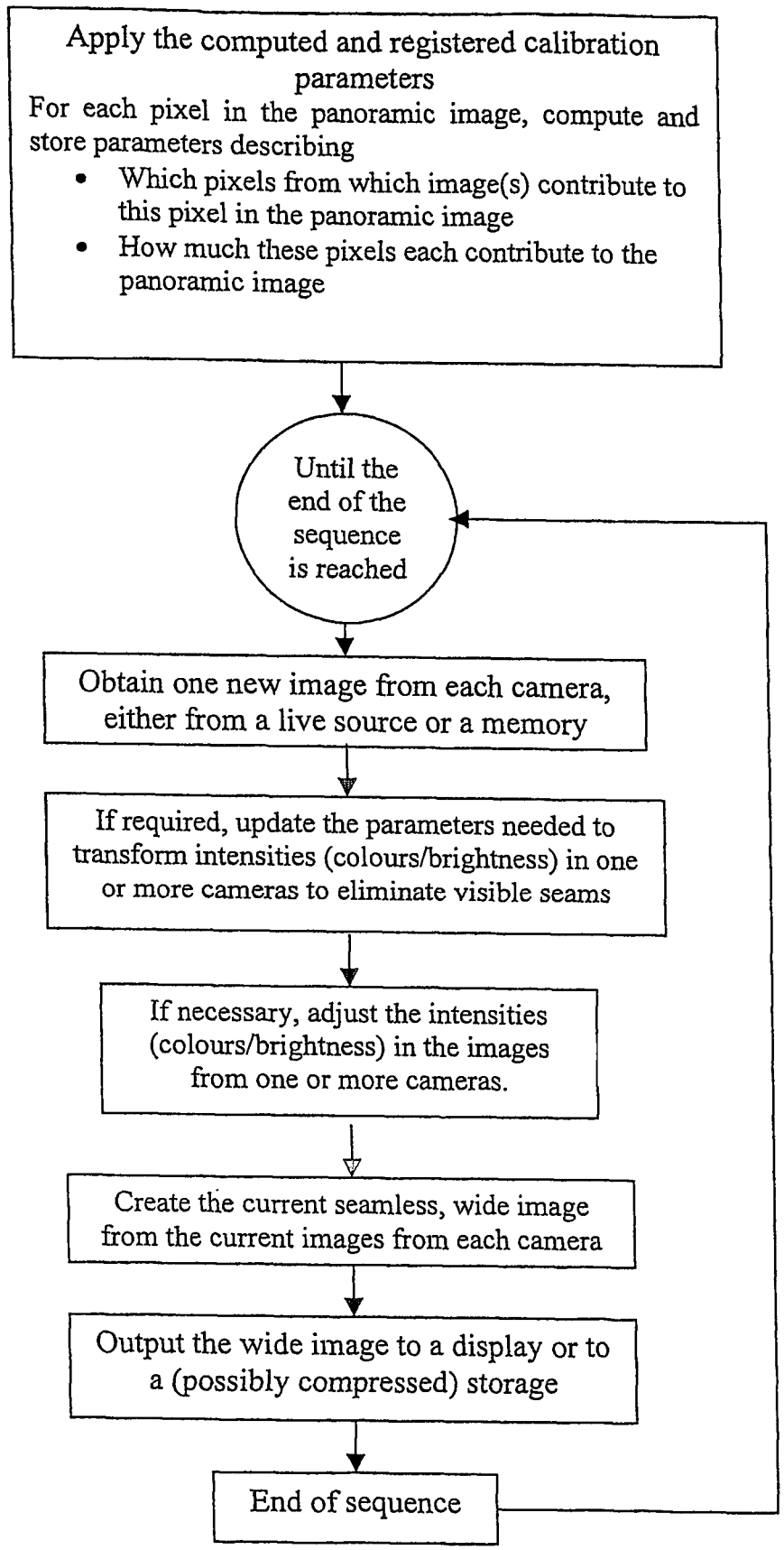
FIG. 10 shows a flow-sheet describing an example of recording of a video sequence according to the invention.

A flow chart over an example of a process for the generation of a video sequence according to the invention is shown in FIG. 10.

1. Apply the computed and registered calibration parameters.

For each pixel in the wide image, compute and store parameters describing a. Which pixels from which image(s) contributes to this pixel in the wide image.

b. How much these pixels each contribute to the wide image.

2. Repeat following steps until the end of the sequence is reached.

3. Obtain one new image from each camera, either from a live source or a memory means.

4. If required, update the parameters needed to transform intensities (colours/brightness) in one or more cameras to eliminate visible seams.

5. If necessary, adjust the intensities (colours/brightness) in the images from one or more.

6. Create the current seamless, wide image from the current images from each camera.

7. Output the wide image to a display or to a (possibly compressed) storage.

8. End of sequence. Return to step 2 until end of generation of the wide image video sequence.

Figure 11:
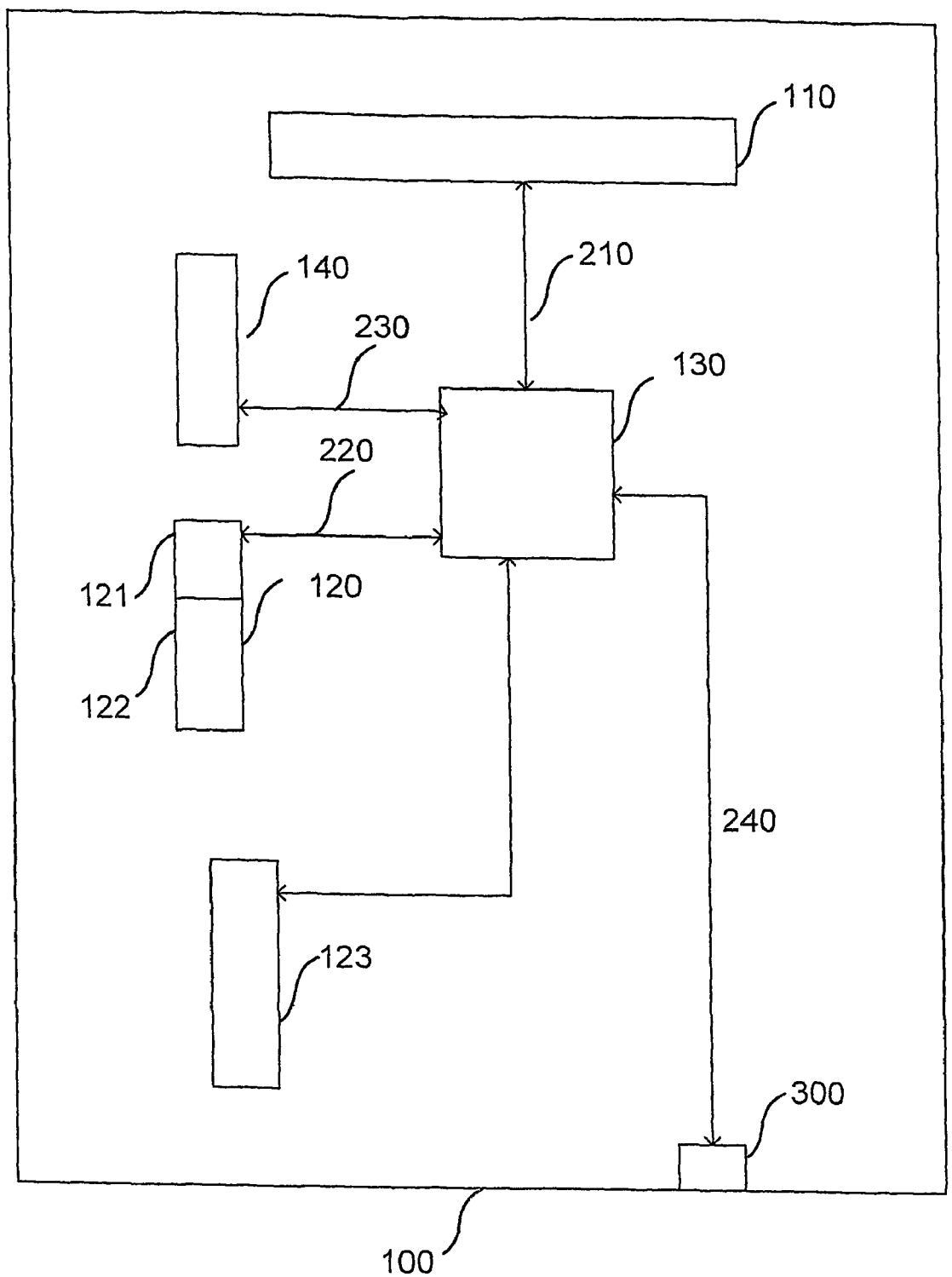
FIG. 11 shows a data processing device for performing the method according to the invention.

In FIG. 11 is shown a device for performing the method according to the invention. With reference to FIG. 11 there is shown a data processing device 100 for performing the methods illustrated in FIGS. 6-10 comprising a display unit 110 for the display of information such as text messages or for showing input data. The data processing device 100 comprises a non volatile memory 120, a microprocessor 130 and a read/write memory 140. The memory 120 has a first memory portion 121 wherein a computer program is stored for controlling the normal functions of the data processing device 100. The memory 120 also has a second memory portion 122, where a program for calibration and recording of video sequences and storing of the resulting wide image video sequence is stored. In another embodiment the program for calibration and recording of video sequences and storing of the resulting wide image is stored on a separate non-volatile recording medium 123. The program may be stored in an executable manner or in a compressed state.

When, in the following, it is described that the microprocessor 130 performs a certain function this is to be understood that the microprocessor performs a certain part of the program which is stored in the memory 120 or a certain part of the program which is stored on the recording medium 123.

The microprocessor 130 is coupled to the display unit 110 via a data bus 210. A user of the data processing device is provided with information messages by means of the program stored displayed messages on the display 110. A particular message may be displayed in response to a certain event, such as for example the microprocessor having run the calibration part of the program and the calibration parameters have been determined, which may prompt the microprocessor to display the message "calibration finished".

The microprocessor 130 is coupled to the memory 120 by means of a data bus 220 and to the read/write memory 140 by means of a data bus 230. The microprocessor 130 also communicates with a data port 300 by means of a data bus 240.

The data port is used for input of the video sequencers, which in reality may stand for a number of input means for input of the received video signals from several video cameras and also as an output means for the composed wide video sequence. The video sequence may be stored within the device in a separate read and write memory for later retrieval or may be forwarded to e.g. a television transmitter.

In this case the wide image has to be adapted to the format possible for a TV-screen. This may be done such that the wide image is cut by manual input or by an automatic routine following a therefore created algorithm.

In case the video sequence is to be watched concurrently with the recording of the same the method and devices are capable of performing the method such that a continuous sequence may be seen.

In case the wide image video is to be preserved for the TV-viewer or rather for a viewer of a therefore adapted screen the wide image may be cut into parallel images to be sent via separate TV-channels and each such image from the concurrently sending TV-channels may thereafter be projected/displayed onto a screen, such that the wide video image sequence will again be composed for the viewer to watch.

The methods described with reference to FIGS. 8-10 can be performed by the microprocessor 130 by means of the microprocessor performing the program stored in the memory portion 120. In response to an instruction to calibrate, the method described with reference to FIG. 9, the microprocessor is set up to follow the steps as described in connection with the description of FIG. 9. Likewise in response to an instruction to record wide video sequences, the method described with reference to FIG. 10, the microprocessor is set up to follow the steps as described in connection with the description of FIG. 10.

The invention also concerns a customised video player specifically aimed at showing widescreen/wide image videos. An example showing the function of this player is shown in FIG. 12a-b.

Figure 12A:
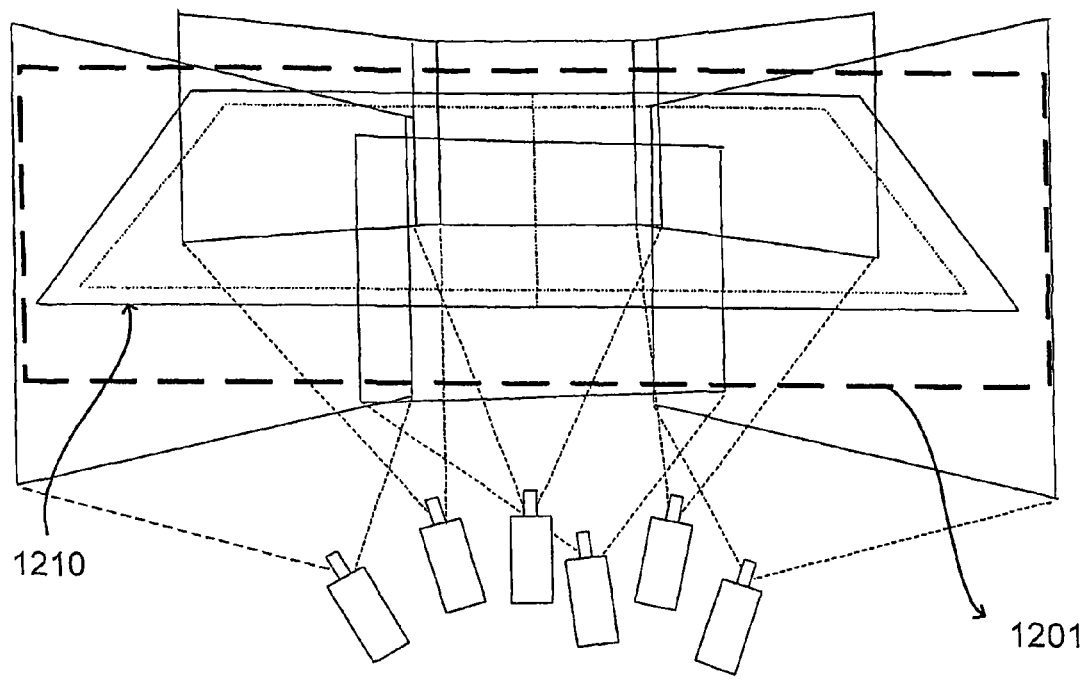

FIG. 12a is essentially the same as FIG. 2. Therefore the details of the figure will not be described further.

The field/pitch is indicated as 1210 and the composed wide image area as 1201. Seeing this view it can easily be understood that the composed wide image will contain much more information than a common video image.

Figure 12B:
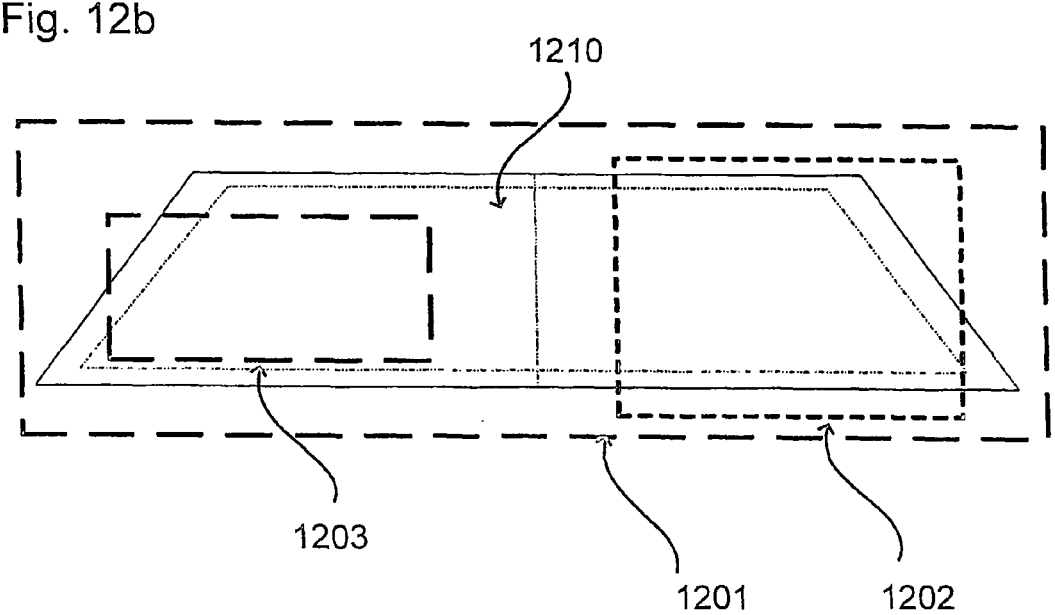

In FIG. 12b is demonstrated that areas like 1203 and 1202 may be chosen from the entire wide video image 1201. The pitch is as before indicated as 1201.

The user may specify a parameter which controls the scale of the display, allowing the user to zoom in if he or she prefers a high-resolution image of part of the pitch rather than a lower-resolution display of the entire pitch. This functionality is especially important when the video contains more pixels in the horizontal or vertical direction (or both) than the display media (e.g. computer monitor, computer projector, or television set) can display.

As the action on the pitch occurs in different locations over time, it is necessary to scroll the video in the x and/or y directions. This is accomplished either (i) manually via controls in the video player, (ii) by software which invokes an algorithm which automatically identifies the interesting region of the pitch, or (iii) using data obtained previously by hand and stored.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

The invention claimed is:

1. A method for generating a wide image video sequence of a scene being recorded using a device having at least two video cameras substantially co-located in a predetermined relationship to each other such that there will be an overlap between images from the respective cameras, said method comprising the steps of:
- a. identifying corresponding lines in overlapping parts of the images from the respective cameras;
- b. calculating a projective transform for pixels of the images from at least one of said cameras based on slopes and positions of said corresponding lines, which said projective transform compensates for the relative rotation between the at least two video cameras;
- c. synchronously recording video sequences using each of said at least two video cameras; and
- d. generating a wide image video sequence by combining said synchronously recorded video sequences using said projective transform.

2. A method according to claim 1, wherein the synchronously recorded video sequences are stored in a memory storage area.

3. A method according to claim 1, wherein the wide image video sequence is transmitted live.

4. A method according to claim 1, wherein the wide image video sequence is stored on a memory storage area.

5. A method according to claim 1 further comprising the following steps:
- a. starting a calibration process;
- b. synchronizing the sequences from each of the at least two cameras;
- c. computing inter-image projective transformations;
- d. using the transformations to refer each image to a common reference frame;
- e. selecting a real or virtual reference camera such that certain lines on the pitch or stadium are substantially horizontal and substantially parallel in the wide image;
- f. selecting a rectangular region of interest within the wide image; and
- g. storing the computed values resulting from the calibration process to be used as calibration parameters.

6. A method according to claim 5 further comprising the step of determining lens distortion parameters for each camera, and correcting radial distortion in each image.

7. A method according to claim 5 further comprising the step of selecting non-linear distortion parameters to reduce perspective distortion of the wide image.

8. A method according to claim 1 in which step c is performed automatically by an algorithm for identification of corresponding features in concurrent video images and the coordinates for the corresponding features are input via a computer means.

9. A method according to claim 1 further comprising performing the following steps until completing the generation of the wide image video sequence:
- a. applying calculated calibration parameters;
- b. until the end of the sequence is reached, for each pixel in the wide image, computing and storing parameters describing (1) which pixels from which images contribute to the respective pixels in the wide image and (2) how much each of the respective pixels contributes to the wide image;
- c. retrieving one new image from each camera;
- d. selectively updating the parameters needed to transform intensities in one or more of the cameras to eliminate visible seams;
- e. selectively adjusting intensities in the images from one or more of the cameras;
- f. creating the current seamless, wide image from the current images from each camera; and
- g. outputting the wide image to a display or to a memory storage area.

10. A method according to claim 9, wherein the new images from each camera are read from live sources, each such source comprising a video camera.

11. A method according to claim 9 wherein the new images from each video camera are read from a memory storage area.

12. A method according to claim 1, wherein said corresponding lines depict a line naturally occurring in the scene being recorded.

13. A method according to claim 12, wherein the scene being recorded is a sports field, and wherein said line naturally occurring in the scene being recorded is a sports field mark line.

14. A method according to claim 1, wherein the step of identifying said corresponding lines is performed manually.

15. A method according to claim 1, wherein the step of identifying said corresponding lines is performed automatically.

16. A device having at least two video cameras substantially co-located and arranged in a predetermined relationship to each other such that there will be an overlap between images from the respective cameras, a processor, at least one memory storage area, wherein the processor is configured to:
- a. identify corresponding lines in overlapping parts of the images from the respective cameras;
- b. calculate a projective transform for pixels of the images from at least one of said cameras based on slopes and positions of said corresponding lines, which said projective transform compensates for the relative rotation between the at least two video cameras;
- c. synchronously record video sequences using each of said at least two video cameras; and
- d. generate a wide image video sequence of a scene being recorded by combining said synchronously recorded video sequences using said projective transform.

17. The device of claim 16, wherein the synchronously recorded video sequences are stored in a memory storage area.

18. The device of claim 16, wherein to calculate calibration parameters, the processor is further configured to:
- a. start a calibration process;
- b. synchronize the sequences from each of the at least two cameras;
- c. compute inter-image projective transformations;
- d. use the transformations to refer each image to a common reference frame;
- e. select a real or virtual reference camera such that certain lines on the pitch or stadium are substantially horizontal and substantially parallel in the wide image;
- f. select a rectangular region of interest within the wide image; and
- g. store the computed values resulting from the calibration process to be used as the calibration parameters.

19. The device of claim 18, wherein to calculate the calibration parameters, the processor is further configured to determine lens distortion parameters for each camera, and correct radial distortion in each image produced.

20. The device of claim 18, wherein to calculate the calibration parameters, the processor is further configured to select non-linear distortion parameters to reduce perspective distortion of the wide image.

21. The device of claim 16, wherein step c is performed automatically by an algorithm for identification of corresponding features in concurrent video images and the coordinates for these corresponding features are input to a computer storage area.

22. The device of claim 16, wherein the processor is further configured to:
   a. apply calculated calibration parameters;
   b. until the end of the sequence is reached, for each pixel in the wide image, compute and store parameters describing (1) which pixels from which images contribute to the respective pixels in the wide image and (2) how much each of the respective pixels contributes to the wide image;
   c. retrieve one new image from each camera;
   d. selectively update the parameters needed to transform intensities in one or more of the cameras to eliminate visible seams;
   e. selectively adjust intensities in the images from one or more of the cameras;
   f. create the current seamless, wide image from the current images from each camera; and
   g. output the wide image to a display or to a memory storage area.

23. The device of claim 22, wherein the new images from each camera are read from live sources, each such source comprising a video camera.

24. The device of claim 22, wherein the new images from each video camera are read from a memory storage area.

25. The device of claim 16, wherein said corresponding lines depict a line naturally occurring in the scene being recorded.

26. The device of claim 16, wherein the scene being recorded is a sports field, and wherein said projective transform refers each image to a common reference frame, and the processor is further configured to select said reference frame such that certain lines on the sports field become essentially horizontal and parallel in the wide image video sequence.

27. A computer-readable medium having computer-readable program code portions stored therein, the computer-readable program code portions comprising executable portions that cause a device having at least two video cameras substantially co-located in a predetermined relationship to each other such that there will be an overlap between images from the respective cameras to:
   a. identify corresponding lines in overlapping parts of the images from the respective cameras;
   b. calculate a projective transform for pixels of the images from at least one of said cameras based on slopes and positions of said corresponding lines, which said projective transform compensates for the relative rotation between the at least two video cameras;
   c. synchronously record video sequences using each of said at least two video cameras; and
   d. generate a wide image video sequence of a scene being recorded by combining said synchronously recorded video sequences using said projective transform.

28. The computer-readable medium of claim 27, wherein the synchronously recorded video sequences are stored in a memory storage area.

29. The computer-readable medium of claim 27, wherein to calculate calibration parameters, the computer-readable medium further comprises executable portions that cause the device to:
   a. start a calibration process;
   b. synchronize the sequences from each of the at least two cameras;
   c. compute inter-image projective transformations;
   d. use the transformations to refer each image to a common reference frame;
   e. select a real or virtual reference camera such that certain lines on the pitch or stadium are substantially horizontal and substantially parallel in the wide image;
   f. select a rectangular region of interest within the wide image; and
   g. store the computed values resulting from the calibration process to be used as the calibration parameters.

30. The computer-readable medium of claim 29, further comprising executable portions that cause the device to determine lens distortion parameters for each camera, and correct radial distortion in each image produced.

31. The computer-readable medium of claim 29, further comprising executable portions that cause the device to select non-linear distortion parameters to reduce perspective distortion of the wide image.

32. The computer-readable medium of claim 29, wherein step c is performed automatically by an algorithm for identification of corresponding features in concurrent video images and the coordinates for the corresponding features are input to a computer means.

33. The computer-readable medium of claim 29, further comprising executable portions that causes the device to:
   a. apply the calculated calibration parameters;
   b. until the end of the sequence is reached, for each pixel in the wide image, compute and store parameters describing (1) which pixels from which images contribute to the respective pixels in the wide image and (2) how much each of the respective pixels contributes to the wide image;
   c. retrieve one new image from each camera;
   d. selectively update the parameters needed to transform intensities in one or more of the cameras to eliminate visible seams;
   e. selectively adjust intensities in the images from one or more of the cameras;
   f. create the current seamless, wide image from the current images from each camera; and
   g. output the wide image to a display or to a memory storage area.

34. The computer-readable medium of claim 29, wherein the new images from each camera are read from live sources, each such source comprising a video camera.

35. The computer-readable medium of claim 29, wherein the new images from each video camera are read from a memory storage area.

36. The computer-readable medium of claim 27, wherein said corresponding lines depict a line naturally occurring in the scene being recorded.

37. The computer-readable medium of claim 27, wherein the scene being recorded is a sports field, and wherein said projective transform refers each image to a common reference frame, and the computer-readable medium further comprises executable portions that cause the device to select said reference frame such that certain lines on the sports field become essentially horizontal and parallel in the wide image video sequence.

38. A video recording apparatus having at least two video cameras substantially co-located in a predetermined relationship to each other such that there will be an overlap between images from the respective cameras, the video recording apparatus comprising:
   a microprocessor (130);
   a memory storage area (120) storing a program for:
      a. identifying corresponding lines in overlapping parts of the images from the respective cameras,
      b. calculating a projective transform for pixels of the images from at least one of said cameras based on slopes and positions of said corresponding lines, which said projective transform compensates for the relative rotation between the at least two video cameras, c. synchronously recording video sequences using each of said at least two video cameras, and d. generating a wide image video sequence of a scene being recorded by combining said synchronously recorded video sequences using said projective transform, a read and write memory storage area (140) for storing data relating to recorded video sequences from the at least two video cameras;

an input component (300) for receiving input of parameters, and input of recorded video sequences; and an output component (300) for outputting of a wide image video sequence.

39. The apparatus of claim 38, wherein said corresponding lines depict a line naturally occurring in the scene being recorded.

40. The apparatus of claim 38, wherein the scene being recorded is a sports field, and wherein said projective transform refers each image to a common reference frame, and the program is further for selecting said reference frame such that certain lines on the sports field become essentially horizontal and parallel in the wide image video sequence.

* * * * *

UNITED STATES PATENT AND TRADEMARK OFFICE
CERTIFICATE OF CORRECTION

PATENT NO. : 7,864,215 B2
APPLICATION NO. : 10/564286
DATED : January 4, 2011
INVENTOR(S) : Carlsson et al.

It is certified that error appears in the above-identified patent and that said Letters Patent is hereby corrected as shown below:

Column 10
Line 30, "nomography" should read --homography--

Column 13
Line 61, "sequencers" should read --sequences--

Signed and Sealed this
Fourteenth Day of February, 2012

David J. Kappos
*Director of the United States Patent and Trademark Office*